United States Patent [19]

Kakugo et al.

[11] Patent Number: 4,663,394

[45] Date of Patent: May 5, 1987

[54] CRYSTALLINE POLYBUTENE-1 COMPOSITIONS

[75] Inventors: Masahiro Kakugo; Kizuku Wakatsuki, both of Chiba, Japan

[73] Assignee: Sumitomo Chemical Company, Limited, Osaka, Japan

[21] Appl. No.: 746,690

[22] Filed: Jun. 20, 1985

[30] Foreign Application Priority Data

Jun. 20, 1984 [JP] Japan ................... 59-126877

[51] Int. Cl.$^4$ ........................... C08F 297/08
[52] U.S. Cl. .................... 525/297; 525/210; 525/216; 526/282; 526/308
[58] Field of Search ............... 526/282, 308; 525/210, 525/216, 297

[56] References Cited

U.S. PATENT DOCUMENTS 3,733,373 5/1973 McConnell .................. 525/216
4,405,772 9/1983 Wong ......................... 526/308

FOREIGN PATENT DOCUMENTS 1101435 1/1968 United Kingdom .

Primary Examiner—Paul R. Michl
Attorney, Agent, or Firm—Sughrue, Mion, Zinn, Macpeak and Seas

[57] ABSTRACT

A crystalline polybutene-1 composition containing from $1 \times 10^{-6}$ to 10% by weight of a vinylcycloalkane unit having a melting point of 180° C. or higher in terms of its homopolymer, is disclosed. The composition has a markedly improved rate of crystal conversion of polybutene-1.

9 Claims, No Drawings

CRYSTALLINE POLYBUTENE-1 COMPOSITIONS

FIELD OF THE INVENTION

This invention relates to a crystalline polybutene-1 composition. More particularly, this invention relates to a crystalline polybutene-1 composition having an extremely improved rate of crystal conversion of polybutene-1.

BACKGROUND OF THE INVENTION

Polybutene-1 is a superior synthetic resin having excellent wear and creep resistances and high mechanical strength, but it has a relatively slow rate of crystallization and an extremely slow solid phase conversion from the metastable form to the stable form after melt molding. Accordingly, it is impossible to use polybutene-1 unless it is allowed to stand for about 7 days until the conversion from the metastable form to the stable form after molding has complete.

Therefore, some attempts have been heretofore made to improve the rate of crystal conversion of polybutene-1. For example, a method wherein butene-1 is random copolymerized with propylene is well known. [See APPLIED POLYMER SYMPOSIA, No. 11, 1–18, (1969).]

SUMMARY OF THE INVENTION

In view of these defects, the present inventors have made extensive investigations, and as a result, they have found that by incorporating a vinylcycloalkane polymer having a melting point of 180° C. or higher in terms of its homopolymer into polybutene-1, the crystallizability of polybutene-1 can be improved, leading to the invention.

That is, an object of this invention is to provide a crystalline polybutene-1 composition containing a vinylcycloalkane polymer having a melting point of 180° C. or higher in terms of its homopolymer.

DETAILED DESCRIPTION OF THE INVENTION

The amount of the vinylcycloalkane polymer having a melting point of 180° C. or higher in terms of its homopolymer used in this invention is not particularly restricted, but in order to not change the inherent properties of polybutene-1, it is desirable to exhibit a nucleating effect with the vinylcycloalkane polymer in a amount as small as possible. Accordingly, the content of the vinylcycloalkane unit in the composition is preferably from $1 \times 10^{-6}$ to 10 wt%, more preferably from $5 \times 10^{-5}$ to 5 wt%.

Illustrative examples of vinylcycloalkanes of the vinylcycloalkane polymer having a melting point of 180° C. or higher in terms of its homopolymer used in this invention are vinylcyclopentane, vinylcyclohexane, vinylnorbornane, etc. Of these, vinylcycloalkanes which can give vinylcycloalkane polymers having a melting point of 240° C. or higher in terms of their homopolymer are preferred.

The cystalline polybutene-1 composition containing a vinylcycloalkane polymer having a melting point of 180° C. or higher in terms of its homopolymer can be produced by the following methods:

(1) Polymerizing a vinylcycloalkane which gives a vinylcycloalkane polymer having a melting point of 180° C. or higher in terms of its homopolymer in the presence of a Ziegler-Natta catalyst and then homopolymerizing butene-1 or copolymerizing butene-1 with other α-olefin;

(2) Blending the polymer obtained in (1) above with a homopolymer of butene-1 or a copolymer of butene-1 with other α-olefin; and (3) Blending a polymer of a vinylcycloalkane having a melting point of 180° C. or higher in terms of its homopolymer with a homopolymer of butene-1 or a copolymer of butene-1 with other α-olefin.

Examples of α-olefins which can be used are those having from 2 to 10 carbon atoms, such as ethylene, propylene, pentene-1, 4-methylpentene-1, and octene-1.

The butene-1 polymer used in (2) and (3) above may be those having mixed therewith known polymers and fillers such as EP (ethylene/propylene) rubber, mica, talc, etc. The blending methods employed in (2) and (3) above may be those usually employed for blending by means of, for example, a Brabender, a roll, a granulator, etc. If desired, additives usually incorporated in polybutene-1, such as degradation preventing agents, lubricants, antistatic agents, etc. may be blended with the composition of this invention.

The catalyst used to obtain the vinylcycloalkane polymer having a melting point of 180° C. or higher in terms of its homopolymer in this invention is a known Ziegler-Natta catalyst which can be used to give isotatic polymers, and titanium trichloride catalysts sold by Toyo Stauffer Co., Ltd., Toho Titanium Co., Ltd., and Marubeni-Solvay Co., Ltd. can be conveniently employed.

Furthermore, the magnesium compound-supported catalysts described in Japanese Patent Application (OPI) Nos. 59916/1982 and 133408/1980 can also be conveniently used. (The term "OPI" as used herein refers to a "published unexamined Japanese patent application".)

(1) [η]:

Measured at 135° C. in tetralin using an Ubbelohde's viscometer.

(2) Crystallization Temperature:

Measured at a temperature falling speed of 4° C. per minute by means of a differential scanning calorimeter (DSC).

(3) Rate of Crystallization:

A press sheet having a size of $15 \times 15 \times 0.1$ mm was formed. After preheating at 180° C. for 10 minutes, the press sheet was rapidly cooled to 65° C., and its change in the degree of birefringence with a lapse of time was measured to calculate the time when it reached a half value of the maximum degree of birefrigence. The time required for that the crystallization proceeded to an extent of 50% was defined at $\tau\frac{1}{2}$.

(4) Measurement of Density:

Measured in accordance with JIS K 6758-68.

EXAMPLE 1

Into a flask purged with argon gas were successively added 200 ml of dehydrated and purified n-heptane, 0.94 g of diethylaluminum chloride and 2.0 g of a titanium trichloride catalyst made by Marubeni-Solvay Co., Ltd., the mixed solution was heated to 60° C., and 10 ml of vinylcyclohexane was then added thereto. The polymerization of vinylcyclohexane was conducted for 60 minutes. The polymer slurry obtained was washed four times with 200 ml of n-heptane to remove the unreacted vinylcyclohexane and diethylaluminum chloride used as the catalyst. By filtration and drying under reduced pressure, the n-heptane was removed from the active slurry which had been washed with n-heptane to obtain 8.2 g of a powder of polyvinylcyclohexane containing the active catalyst. The amount of polyvinylcyclohexane was 3.1 g of per gram of the charged solid catalyst.

Using 0.69 g of the vinylcyclohexane polymerization catalyst obtained above and 1.5 g of diethylaluminum chloride, butene-1 was polymerized in a 1-liter stainless steel autoclave at a temperature of 30° C. under a pressure of 2 kg/cm$^2$-G for 5 hours. After completion of the polymerization, the unreacted butene-1 was purged to stop the polymerization, and the powder polymer formed was taken out. The powdery polymer was washed with 500 ml of 1N hydrochloric acid and then with methanol until the washings became neutral.

The powder was dried and then weighed to be 80 g. The amount of butene-1 polymerized was 178 g per gram of the titanium trichloride catalyst, and the polymer had an [$\eta$] of 7.6 dl/g. The content of the polyvinylcyclohexane in the copolymer powder, calculated from the amount of vinylcyclohexane polymerized per gram of the titanium-containing solid catalyst, was 1.7% by weight.

To 100 parts by weight of the obtained copolymer were added 0.2 part by weight of BHT (2,6-di-tertiary-butylhydroxytoluene) and 0.05 part by weight of calcium stearate as stabilizers and 0.05 part by weight of Irganox ® 1010 (antioxidant, made by Ciba-Geigy AG; tetrakis[methylene-3-(3',5'-di-tertiary-butyl-4-hydroxyphenyl)propionate]methane), and the mixture was kneaded by a hot roll at 180° C. for 5 minutes. The resulting mixture was melted and pressed by a hot press-forming machine kept at 180° C., and then cooled by a cold press having water at 30° C. circulated therethrough, to form a press sheet having a thickness of 0.5 mm. The densities of the press sheet were measured at 4, 24 and 48 hours after the formation of the press sheet and found to be 0.9113, 0.9131 and 0.9136 g/ml, respectively. This demonstrates that the solid phase conversion of crystal form is very fast. A crystallization temperature of the composition was measured to be 86.4° C. Also, the composition had a rate of crystallization ($\tau_{\frac{1}{2}}$) of 6 seconds.

EXAMPLE 2

To 100 parts by weight of polybutene-1 (WITRON 1200S, sold by Adecargas Co., Ltd.) were added 0.5 part by weight of the copolymer obtained in Example 1, 0.2 part by weight of BHT and 0.05 part by weight of calcium stearate as stabilizers and 0.05 part by weight of Irganox ® 1010, and the mixture was kneaded by a Brabender at 180° C. for 5 minutes. This composition was found to have a crystallization temperature of 71.3° C. and a rate of crysallization ($\tau_{\frac{1}{2}}$) of 10 seconds.

COMPARATIVE EXAMPLE 1

For comparison, the crystallization temperature and rate of crystallization ($\tau_{\frac{1}{2}}$) of polybutene-1 (WITRON 1200S) without blending the copolymer obtained in Example 1 were measured. They were 60.8° C. and 64 seconds, respectively. Also, a press sheet having a thickness of 0.5 mm was prepared under the same condition as in Example 1, and densities of the press sheet were measured at 4, 24 and 48 hours after the pessing.

As the result, they were 0.8914 or less, 0.9048 and 0.9059 g/ml, respectively. This demonstrates that the solid phase conversion from the metastable form crystal to the stable form crystal is very slow.

While the invention has been described in detail and with reference to specific embodiments thereof, it will be apparent to one skilled in the art that various changes and modifications can be made therein without departing from the spirit and scope thereof.

What is claimed is:

1. A crystalline polybutene-1 composition comprising a multistage copolymer (block copolymer) of a vinylcycloalkene having a melting point of 180° C. or higher in terms of its homopolymer and butene-1, said composition containing from $1 \times 10^{-6}$ to 10% by weight of a vinylcycloalkane unit, wherein in the first stage, a homopolymer of a vinylcycloalkane or a copolymer containing as a major component a vinylcycloalkane is at least prepared.

2. A crystalline polybutene-1 composition as claimed in claim 1, wherein in the polymerization of butene-1, butene-1 is copolymerized with a small amount of other α-olefin.

3. A crystalline polybutene-1 composition as claimed in claim 1, wherein said vinylcycloalkane unit has a melting point of 240° C. or higher in terms of its homopolymer.

4. A crystalline polybutene-1 composition as claimed in claim 1, wherein said vinylcycloalkane is vinylcyclopentane, vinylcyclohexane, or vinylnorbornane.

5. A crystalline polybutene-1 composition comprising a blend of (A) a crystalline homopolymer of butene-1 or a crystalline copolymer of butene-1 with a small amount of other α-olefin and (B) said crystalline polybutene-1 composition or homopolymer of vinylcycloalkane as claimed in any of claims 1 to 4 wherein from $1 \times 10^{-6}$ to 10% by weight of a vinylcycloalkane unit is contained.

6. A crystalline polybutene-1 composition comprising a multistage copolymer comprising (A) an initial stage consisting essentially of a vinylcycloalkane having a melting point of 180° C. or higher in terms of its homopolymer and (B) a second stage consisting essentially of butene-1, said composition containing from $1 \times 10^{-6}$ to 10% by weight of said vinylcycloalkane.

7. A crystalline polybutene-1 composition as claimed in claim 6 wherein said second stage includes an α-olefin other than butene-1.

8. A crystalline polybutene-1 composition comprising a blend of (A) a crystalline polybutene-1 composition as claimed in claim 6 and (B) a crystalline copolymer of butene-1 or a crystalline copolymer of butene-1 with a small amount of an α-olefin other than butene-1.

9. A crystalline polybutene-1 composition prepared by the steps of:
(a) polymerizing a vinylcycloalkane which gives a vinylcycloalkane polymer having a melting point of 140° C. or higher in terms of its homopolymer in the presence of a Zeigler Natta catalyst to give a mixture of vinylcycloalkane polymer together with the catalyst; and then
(b) polymerizing butene-1, alone or together with another α-olefin, in the presence of said mixture of vinylcycloalkane polymer and catalyst.

* * * * *